(12) United States Patent
Chen

(10) Patent No.: US 9,690,114 B2
(45) Date of Patent: Jun. 27, 2017

(54) EYEGLASSES WITH REPLACEABLE TEMPLES

(71) Applicant: Lin-Yun Chen, Tainan (TW)

(72) Inventor: Lin-Yun Chen, Tainan (TW)

( * ) Notice: Subject to any disclaimer, the term of this patent is extended or adjusted under 35 U.S.C. 154(b) by 0 days.

(21) Appl. No.: 15/008,351

(22) Filed: Jan. 27, 2016

(65) Prior Publication Data

US 2017/0146817 A1 May 25, 2017

(30) Foreign Application Priority Data

Nov. 19, 2015 (TW) .............................. 104138179 A

(51) Int. Cl.
*G02C 5/14* (2006.01)
*G02C 5/22* (2006.01)

(52) U.S. Cl.
CPC ........... *G02C 5/22* (2013.01); *G02C 2200/02* (2013.01)

(58) Field of Classification Search
CPC ............. G02C 5/14; G02C 9/04; G02C 5/146
USPC .................................. 351/116, 119, 111, 156
See application file for complete search history.

(56) References Cited

U.S. PATENT DOCUMENTS

| | | | | |
|---|---|---|---|---|
| 3,422,449 A | * | 1/1969 | Rinnman | G02C 5/2272 351/120 |
| 5,682,222 A | * | 10/1997 | Chao | G02C 5/2254 351/111 |
| 7,422,323 B2 | * | 9/2008 | Saitoh | G02C 5/22 16/228 |
| 7,533,986 B2 | * | 5/2009 | Umeda | G02C 5/146 351/114 |
| 7,575,318 B2 | * | 8/2009 | Kux | G02C 11/02 16/228 |
| 2009/0195747 A1 | * | 8/2009 | Insua | G02C 5/146 351/116 |
| 2014/0104562 A1 | * | 4/2014 | Kim | G02C 5/146 351/116 |

* cited by examiner

*Primary Examiner* — Hung Dang
(74) *Attorney, Agent, or Firm* — Alan D. Kamrath; Kamrath IP Lawfirm, P.A.

(57) ABSTRACT

A pair of eyeglasses with replaceable temples includes a glasses frame, two connecting members, and two temples. The glasses frame includes a first end and a second end spaced from the first end in a lateral direction, each of which forms a coupling base extending inward in a longitudinal direction perpendicular to the lateral direction. A recess and a first magnet are included in each coupling base. A first segment of each connecting member is held in the recess of a corresponding coupling base. A second magnet is included in the first segment of each connecting member and coupled with the first magnet in the corresponding coupling base to allow the connecting members to be securely coupled with the glasses frame. A front end of each temple is engaged with a second segment of one of the connecting members. The pair of eyeglasses features temples removed and fixed conveniently.

7 Claims, 4 Drawing Sheets

EYEGLASSES WITH REPLACEABLE TEMPLES

BACKGROUND OF THE INVENTION

1. Field of the Invention

The present invention relates to a pair of eyeglasses with replaceable temples and, more particularly, to a combination structure of a temple and a glasses frame.

2. Description of the Related Art

In the era of materialism, people with novelty aspirations are fastidious about portable decorative objects. For example, sunglasses or leisure eyeglasses are popularized among persons who value the eyeglasses aesthetically matching costumes. In this regard, a user who prefers versatile fancy sunglasses or leisure eyeglasses may change the temples of a pair of eyeglasses frequently to match his/her mood or costumes. However, a user may end up purchasing a new pair of eyeglasses because temples of the eyeglasses are difficult to replace. Purchase of a new pair of eyeglasses for this purpose is not cost effective.

Specifically, a pair of eyeglasses conventionally includes a glasses frame and two temples pivotally fitted at both sides of the glasses frame. Each of the temples directly joining and corresponding to the glasses frame with a pivotal member such as a screw or a pin can be folded or unfolded. However, a user intending to change an old temple usually makes use of a tool to remove the pivotal member and strenuously secure it at a new temple. Furthermore, the pivotal member is externally exposed and easily smudged or rusted and, thus, has negative effects on appearance of a pair of eyeglasses and smoothness of the temples to be rotated about the pivotal member. In addition, it is inconvenient to remove a pair of eyeglasses hung on a user's chest with a neck cord when the pair of eyeglasses along with the neck cord needs to be lifted over the user's head.

BRIEF SUMMARY OF THE INVENTION

Thus, an objective of the present invention is to provide a pair of eyeglasses to which a neck cord is favorably connected in practice, and allows temples to be removed/replaced or fixed conveniently.

To achieve this and other objectives, a pair of eyeglasses of the present invention includes a glasses frame, two connecting members, and two temples. The glasses frame includes first and second ends spaced in a lateral direction and at least one lens support slot between the first and second ends. The glasses frame further includes two coupling bases each extending inward from one of the first and second ends of the glasses frame in a longitudinal direction perpendicular to the lateral direction. Each coupling base includes outer and inner surfaces spaced in the lateral direction, with the inner surfaces of the two coupling bases opposite to each other. A recess and a first magnet are provided in the outer surface of each coupling base. Each connecting member is detachably connected to the glasses frame and includes a first segment and a second segment spaced from the first segment in the longitudinal direction. The first segment of each connecting member is held in the recess of a corresponding coupling base, and a second magnet is provided in the first segment of each connecting member and coupled with the first magnet in the corresponding coupling base to allow the two connecting members to be securely coupled with the glasses frame. Each temple includes front and rear ends spaced in a length direction thereof. The front end of each temple is connected with the second segment of one of the connecting members.

In a preferred form, the second segment of each connecting member includes a coupling portion having a through-hole therein. An indentation is designed in the front end of each temple for receiving the coupling portion of a corresponding connecting member. Both the indentation and the through-hole of the coupling portion are penetrated by a pivot so that the temple is connected with the corresponding connecting member and rotatable relative to the glasses frame about an axis defined by the pivot.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
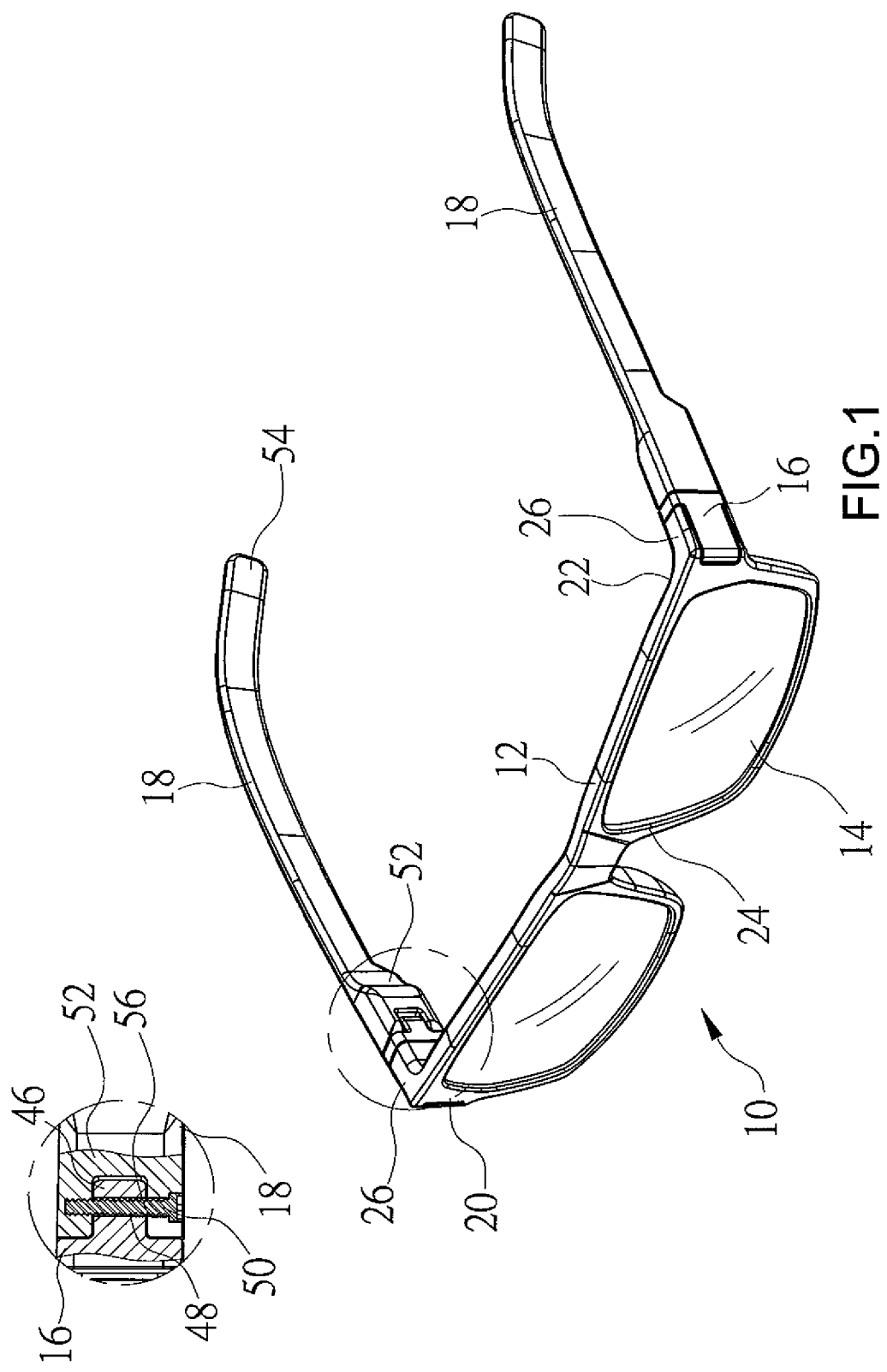
FIG. 1 is a perspective view of a pair of eyeglasses in accordance with an embodiment of the present invention and shows a sectional view of a circled portion in the perspective view.
Figure 2:
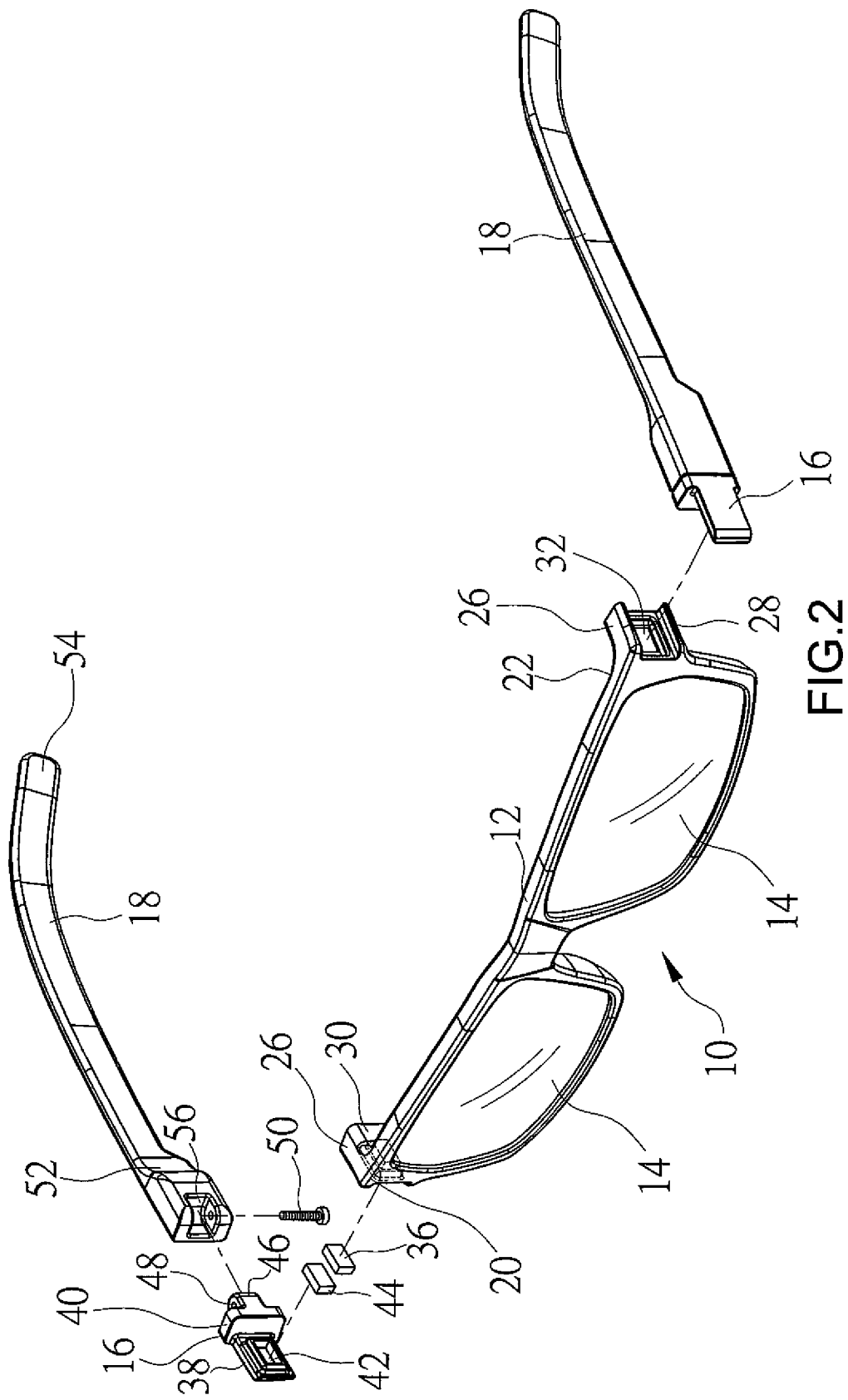
FIG. 2 shows an exploded view of the pair of eyeglasses of FIG. 1.
Figure 3:
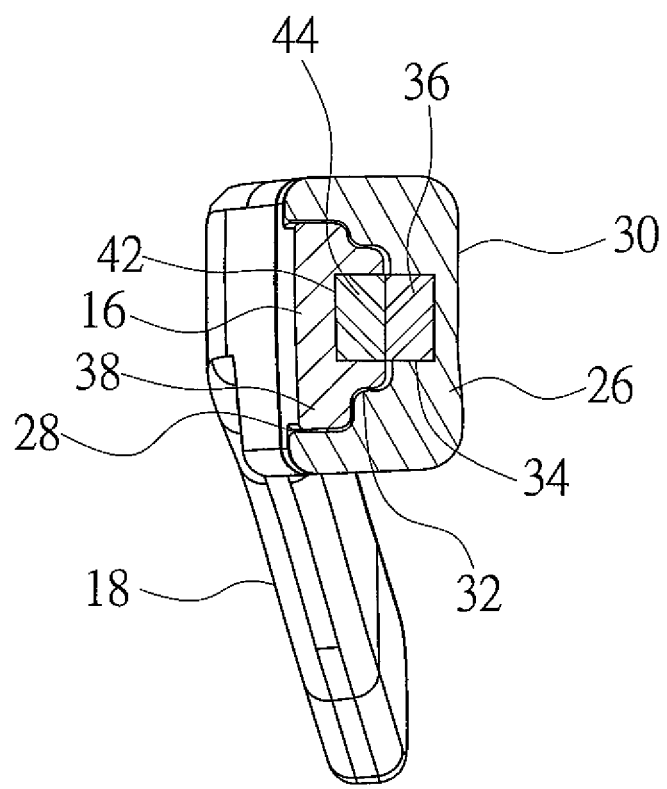
FIG. 3 is a sectional view of the pair of eyeglasses of FIG. 1 illustrating a connecting member and a glasses frame both of which links together.

A pair of eyeglasses 10 according to the preferred teachings of the present invention is shown in FIGS. 1 through 3 of the drawings and includes a glasses frame 12, at least one lens 14, two connecting members (first and second connecting members) 16, and two temples (first and second temples) 18. The eyeglasses 10 may be a pair of sunglasses, leisure eyeglasses, sports eyeglasses, protective goggles, nearsighted eyeglasses, farsighted spectacles, presbyopic glasses, etc. The glasses frame 12 is made of materials including, without limitation, metal, alloy, or plastic. Both the connecting members 16 and the temples 18 are made of plastic, rubber, or metal. The connecting members 16 and the corresponding temples 18 which are respectively identical to each other in structure are explained according to one of the connecting members 16 and one corresponding temple 18.

The glasses frame 12 includes first and second ends 20 and 22 spaced in a lateral direction. The glasses frame 12 further includes at least one lens support slot 24 located between the first and second ends 20 and 22. In this embodiment, the glasses frame 12 includes two lens support slots 24 in which two lenses 14 are respectively installed. The glasses frame 12 further includes two coupling bases 26 each extending inward from one of the first and second ends 20 and 22 of the glasses frame 12 in a longitudinal direction perpendicular to the lateral direction. Each coupling base 26 includes outer and inner surfaces 28 and 30 with the inner surfaces 30 of the two coupling bases 26 opposite to each other. A recess 32 is formed in the outer surface 28 of each coupling base 26, and a cavity 34 is designed in the recess 32 for accommodating a first magnet 36 (see FIG. 3).

Each connecting member 16 is detachably connected to the glasses frame 12 and includes spaced first and second segments 38 and 40. The first segment 38 of each connecting member 16 is held in the recess 32 of a corresponding coupling base 26 and includes a cavity 42 in an inner side thereof (see FIG. 3). A second magnet 44 is accommodated in the cavity 42 and coupled with the first magnet 36 in the corresponding coupling base 26, allowing the connecting members 16 to be securely coupled with the glasses frame 12. It should be understood the first and second magnets 36 and 44 could be two magnets or a combination of a magnet and a magnetic conductance component. The magnetic conductance component could be a metal or alloy. In this embodiment, the second segment 40 of each of the connecting members 16 includes a coupling portion 46 having a through-hole 48 therein for receiving a pivot 50.

Each temple 18 includes front and rear ends 52 and 54 spaced in a length direction thereof. The front end 52 of each temple 18 is connected with one of the connecting members 16, and the rear end 54 of each temple 18 is adapted to be worn on a user's ear. An indentation 56 is designed in the front end 52 of each temple 18 for receiving the coupling portion 46 of a corresponding connecting member 16. When both the indentation 56 and the through-hole 48 of the coupling portion 46 are penetrated by the pivot 50, the temple 18 is coupled with the corresponding connecting member 16 and rotatable relative to the glasses frame 12 between an unfolded position and a folded position about an axis defined by the pivot 50.

Figure 4:
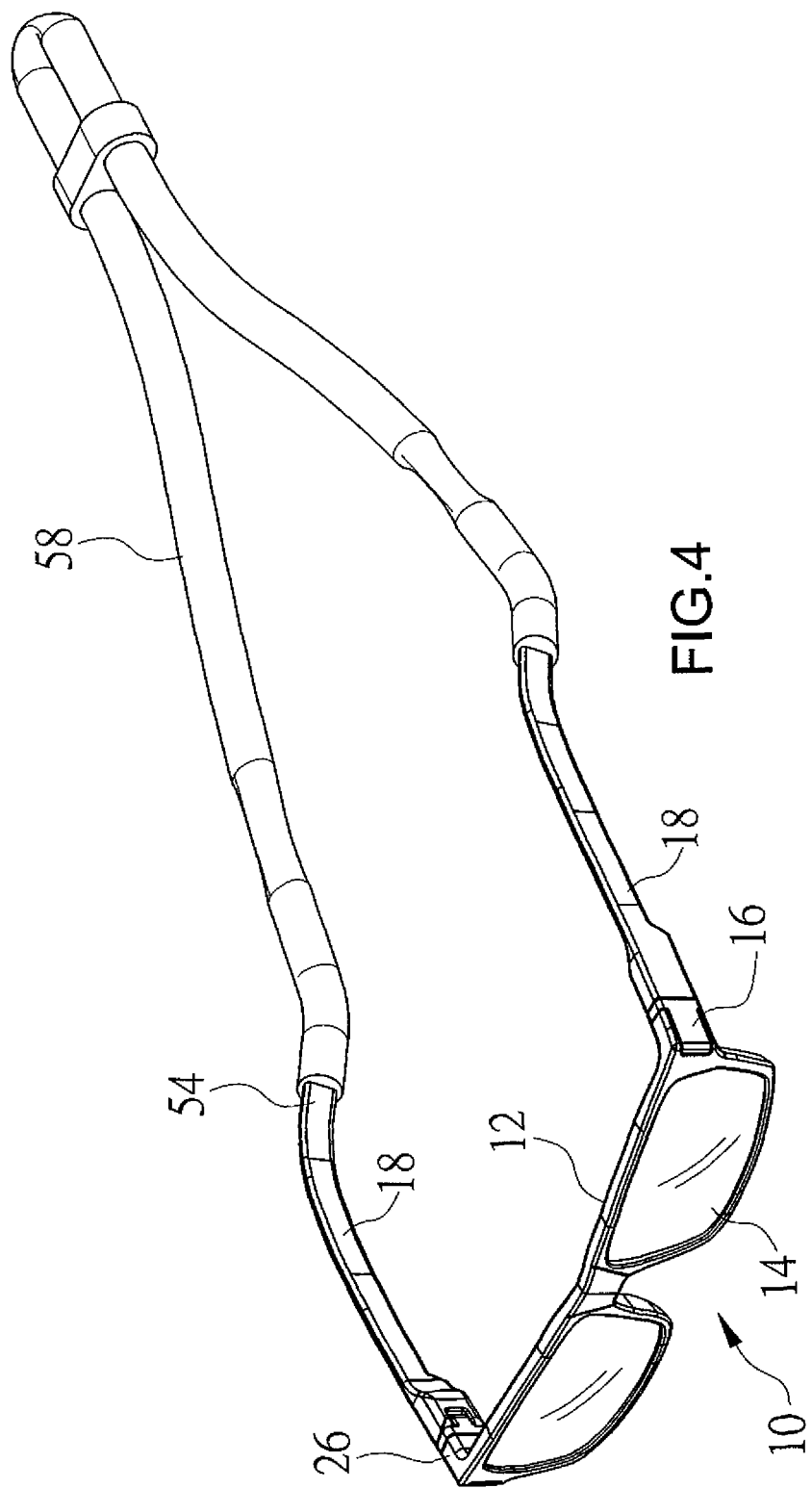
FIG. 4 is a perspective view which illustrates the pair of eyeglasses of FIG. 1 combined with a neck cord.

In the present disclosure, the pair of eyeglasses 10 features temples 18 removed and fixed conveniently. Specifically, both each temple 18 and a corresponding connecting member 16 are removed from the glasses frame 12 when the second magnet 44 and the first segment 38 of the connecting member 16 are separated from the first magnet 36 and the coupling base 26 with which the connecting member 16 is coupled. On the other hand, the temple 18 to be assembled is securely fixed on the glasses frame 12 when the first segment 38 of the connecting member 16 is held in the recess 32 of the coupling base 26 and the second magnet 44 combines the first magnet 36. Furthermore, a neck cord 58 can be connected to the rear ends 54 of the two temples 18, as shown in FIG. 4. The pair of eyeglasses 10 hung on a user's chest with the neck cord 58 can be removed from the user's head conveniently when the first segment 38 of one of the connecting members 16 and the second magnet 44 on the connecting member 16 are respectively separated from a corresponding coupling base 26 of the glasses frame 12 and the first magnet 36 on the corresponding coupling base 26.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pair of eyeglasses with replaceable temples, comprising:
a glasses frame including first and second ends spaced in a lateral direction and at least one lens support slot between the first and second ends, with the glasses frame further including two coupling bases each extending inward from one of the first and second ends of the glasses frame in a longitudinal direction perpendicular to the lateral direction, with each coupling base including outer and inner surfaces spaced in the lateral direction, with the inner surfaces of the two coupling bases positioned intermediate the outer surfaces of the two coupling bases, with a recess and a first magnetic component provided in the outer surface of each coupling base;

two connecting members detachably connected to the glasses frame, with each connecting member including a first segment and a second segment spaced from the first segment in the longitudinal direction, with the first segment of each connecting member held in the recess of a corresponding coupling base, with a second magnetic component provided in the first segment of each connecting member and coupled with the first magnetic component in the corresponding coupling base to allow the two connecting members to be securely coupled with the glasses frame, wherein the first magnetic component and the second magnetic component are magnetically attracted to each other; and two temples, with each temple including front and rear ends spaced in a length direction thereof, with the front end of each temple connected with the second segment of one of the connecting members.

2. The pair of eyeglasses according to claim 1, wherein the second segment of each connecting member includes a coupling portion having a through-hole therein, with an indentation designed in the front end of each temple for receiving the coupling portion of a corresponding connecting member, with both the indentation and the through-hole of the coupling portion penetrated by a pivot so that the temple is connected with the corresponding connecting member and rotatable relative to the glasses frame about an axis defined by the pivot.

3. The pair of eyeglasses according to claim 1, wherein one of the first and second magnetic components is a magnet and another of the first and second magnetic components is a magnetic conductance component.

4. The pair of eyeglasses according to claim 1, wherein the first magnetic component is a magnet and the second magnetic component is a magnet.

5. The pair of eyeglasses according to claim 1, wherein the first segment of each connecting member has a size in a height direction perpendicular to the lateral and longitudinal directions corresponding to the recess of the corresponding coupling base to hold the first segment against movement in the height direction relative to the recess of the corresponding coupling base.

6. The pair of eyeglasses according to claim 5, wherein the first segment of each connecting member has a size in the longitudinal direction corresponding to the recess of the corresponding coupling base to hold the first segment against movement in the longitudinal direction beyond the glasses frame and the recess of the corresponding coupling base.

7. A pair of eyeglasses with replaceable temples, comprising:
a glasses frame including first and second ends spaced in a lateral direction and at least one lens support slot between the first and second ends, with the glasses frame further including two coupling bases each extending inward from one of the first and second ends of the glasses frame in a longitudinal direction perpendicular to the lateral direction, with each coupling base including outer and inner surfaces spaced in the lateral direction, with the inner surfaces of the two coupling bases opposite to each other, with a recess and a first magnet provided in the outer surface of each coupling base;

two connecting members detachably connected to the glasses frame, with each connecting member including a first segment and a second segment spaced from the first segment in the longitudinal direction, with the first segment of each connecting member held in the recess of a corresponding coupling base, with a second magnet provided in the first segment of each connecting member and coupled with the first magnet in the corresponding coupling base to allow the two connecting members to be securely coupled with the glasses frame; and two temples, with each temple including front and rear ends spaced in a length direction thereof, with the front end of each temple connected with the second segment of one of the connecting members, wherein a cavity is designed in the recess for accommodating the first magnet, with another cavity formed in an inner side of the first segment of each connecting member for accommodating the second magnet.

* * * * *